J. O. STEWART.
Process for Amalgamating Chloridized Ores.
No. 204,773. Patented June 11, 1878.
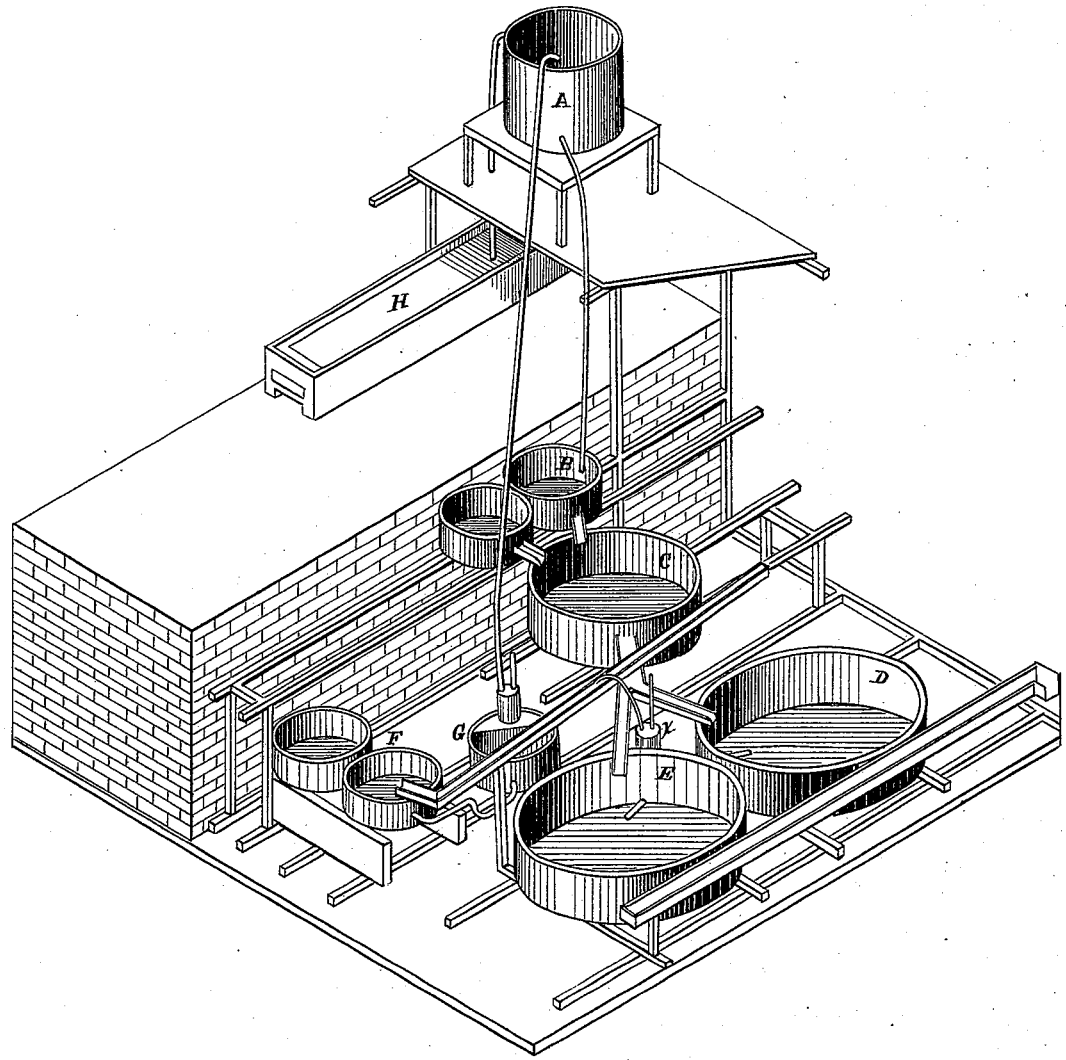
Witnesses
Inventor
James O. Stewart

UNITED STATES PATENT OFFICE.

JAMES O. STEWART, OF GEORGETOWN, COLORADO.

IMPROVEMENT IN PROCESSES FOR AMALGAMATING CHLORIDIZED ORES.

Specification forming part of Letters Patent No. 204,773, dated June 11, 1878; application filed January 14, 1878.

*To all whom it may concern:*

Be it known that I, JAMES O. STEWART, of Georgetown, county of Clear Creek, State of Colorado, have invented an Improvement in the Amalgamation of Chloridized Ores; and I do hereby declare the following to be a full, clear, and exact description thereof, reference being had to the accompanying drawings.

My invention relates to the amalgamation of gold and silver contained in chloridized ores, and is more particularly intended as an improvement upon the process which is described and claimed in the Letters Patent No. 151,763, which were issued to Douglas, Hunt, and Stewart on the 9th day of June, 1874.

In amalgamating chloridized ores heretofore salt-water has been added to the pulp in the amalgamating-pan, and this water combined with the chloride of sodium contained in the pulp formed a brine or saline solution that materially aided the amalgamating process by holding the compounds of the base metals in solution, while the mercury combined with the gold and silver. Each fresh charge of pulp was treated with a new charge of salt-water, so that only the salt contained in each charge of pulp and in each new charge or portion of brine was utilized for this purpose. I have discovered, however, that I can obtain much better results by a repeated use of the brine thus formed, instead of depending solely upon the salt contained in each charge of pulp.

I chloridize the ores of silver, whether with or without gold, by roasting them in the ordinary way with common salt, and then amalgamate them with mercury in wooden pans or barrels, out of contact with iron, but with copper linings or balls, using in the operation, instead of water, the liquors from a previous amalgamation. The liquors, after the amalgation is completed, are carefully preserved for use with fresh portions of the ore previously chloridized by roasting with salt.

I thus secure the advantage of a strong brine for holding in solution the compounds of the base metals, and favor the amalgamation of the precious metals more than can be done with water or single use of weak brine, which is ordinarily used with the mercury in working chloridized ores, for the strong brine holding in solution other chlorides and compounds of base metals extracted from the previous charges of the ore, and used out of contact with metallic iron, acts upon portions of ore not perfectly roasted, and causes a larger yield of the precious metals than can be obtained by the use of salt-water, as in ordinary amalgamation.

For securing the results of this improvement I use an apparatus constructed as follows, reference being had to the accompanying drawing, in which the figure is a perspective view of my invention.

A is a store-tank for holding the recovered salt solutions. From this tank I draw the brine into a wooden pan or barrel, B, and charge it with the roasted ore. It is then heated by steam, and the mercury is added. In a few hours the contents are drawn into a settler-tub, C, which is also of wood. When the mercury and amalgam have sufficiently settled, the contents, consisting of ore and brine, are drawn off into a filter-tub, D. Here the brine is filtered out and allowed to run through a tub, E, which contains copper or mercury, or both, to precipitate any silver or gold which may still remain in solution, and thence is pumped, by means of pump X, into another tub, F, to precipitate any copper which may be in solution, and thence to the pump-tub G, to be raised to the aforesaid supply-tank A for use again in fresh charges of ore. Any surplus of brine will overflow from the supply-tank to the evaporator H for boiling or crystallizing the salt.

The ore from the aforesaid filter-tub is shoveled into the waste-sluice.

Having thus described my invention, what I claim, and desire to secure by Letters Patent, is—

1. The process herein described of treating chloridized ores with mercury, for the purpose of amalgamating the precious metals contained therein, consisting in mixing the charge of ore with mercury out of contact with iron, and then subjecting the mass to the action of a strong brine which has been used on a previous charge of ore, whereby the chlorides and other reagents contained in the lixivium of one charge of ore are utilized upon the subsequent charges, substantially as set forth.

2. In combination with the wooden amalgamating-pan B, settler C, filter-tub D, and supplemental settling-tubs E F, the pump G, reservoir A, and evaporator H, all combined and arranged to operate substantially as and for the purpose described.

In witness whereof I have hereunto set my hand and seal.

JAMES O. STEWART. [L. S.]

Witnesses:
  FRANK A. BROOKS,
  WALTER C. BEATIE.